(12) United States Patent
Melanson et al.

(10) Patent No.: US 9,624,871 B2
(45) Date of Patent: Apr. 18, 2017

(54) METHOD AND APPARATUS FOR SUPPLYING A GASEOUS FUEL TO AN INTERNAL COMBUSTION ENGINE

(71) Applicant: Westport Power Inc., Vancouver (CA)

(72) Inventors: Bradley E. Melanson, Vancouver (CA); Melissa S. A. McKinnon, Vancouver (CA); Paul M. Blomerus, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 242 days.

(21) Appl. No.: 14/311,321

(22) Filed: Jun. 22, 2014

(65) Prior Publication Data
US 2014/0299101 A1    Oct. 9, 2014

Related U.S. Application Data

(63) Continuation of application No. PCT/CA2012/050931, filed on Dec. 21, 2012.

(30) Foreign Application Priority Data

Dec. 22, 2011    (CA) ..................... 2762697

(51) Int. Cl.
*F02M 21/02*    (2006.01)
*F02M 21/06*    (2006.01)
(Continued)

(52) U.S. Cl.
CPC ......... *F02M 21/0218* (2013.01); *B60K 15/07* (2013.01); *F02M 21/06* (2013.01);
(Continued)

(58) Field of Classification Search
CPC .......... F02M 21/0218; F02M 21/0221; F02M 21/029; F02M 21/06; F02D 19/022
(Continued)

(56) References Cited

U.S. PATENT DOCUMENTS 3,864,928 A    2/1975    Eigenbrod
4,112,875 A    9/1978    Laumann et al.
(Continued)

FOREIGN PATENT DOCUMENTS

CA    2523732 A1    4/2006
CA    2653643 A1    5/2009
(Continued)

OTHER PUBLICATIONS

"An evaluation of natural gas-fueled locomotives", published Nov. 2007 by BNSF Railway Company, Union Pacific Railroad Company (UPRR), the Association of American Railroads, and the California Environmental Associates.
(Continued)

*Primary Examiner* — Mahmoud Gimie
(74) *Attorney, Agent, or Firm* — Carie C. Mager; C. Larry Kyle

(57) ABSTRACT

An apparatus and method for supplying gaseous fuel from a tender car to an internal combustion engine on a locomotive comprising storing the gaseous fuel at a cryogenic temperature in a cryogenic storage tank on the tender car; pumping the gaseous fuel to a first pressure from the cryogenic storage tank; vaporizing the gaseous fuel at the first pressure; and conveying the vaporized gaseous fuel to the internal combustion engine; whereby a pressure of the vaporized gaseous fuel is within a range between 310 bar and 575 bar.

22 Claims, 5 Drawing Sheets

(51) Int. Cl.
*F17C 5/06* (2006.01)
*F17C 9/02* (2006.01)
*B60K 15/07* (2006.01)
*F02M 31/00* (2006.01)
*F02D 19/02* (2006.01)
*B60K 15/03* (2006.01)

(52) U.S. Cl.
CPC ............... *F02M 31/00* (2013.01); *F17C 5/06* (2013.01); *F17C 9/02* (2013.01); *B60K 2015/03315* (2013.01); *B60Y 2200/31* (2013.01); *F02D 19/022* (2013.01); *F02M 21/023* (2013.01); *F02M 21/029* (2013.01); *F02M 21/0221* (2013.01); *F17C 2201/054* (2013.01); *F17C 2205/0126* (2013.01); *F17C 2205/0157* (2013.01); *F17C 2221/032* (2013.01); *F17C 2221/033* (2013.01); *F17C 2223/0161* (2013.01); *F17C 2223/033* (2013.01); *F17C 2223/043* (2013.01); *F17C 2223/046* (2013.01); *F17C 2225/0123* (2013.01); *F17C 2225/036* (2013.01); *F17C 2227/0135* (2013.01); *F17C 2227/0185* (2013.01); *F17C 2227/0323* (2013.01); *F17C 2227/0332* (2013.01); *F17C 2227/0393* (2013.01); *F17C 2250/01* (2013.01); *F17C 2250/032* (2013.01); *F17C 2250/043* (2013.01); *F17C 2250/0408* (2013.01); *F17C 2250/0434* (2013.01); *F17C 2250/0439* (2013.01); *F17C 2250/0491* (2013.01); *F17C 2250/0636* (2013.01); *F17C 2265/066* (2013.01); *F17C 2270/0173* (2013.01); *Y02T 10/16* (2013.01)

(58) Field of Classification Search
USPC ... 123/445, 27 GE, 525–529, 531, 575, 304, 123/299; 701/103, 104
See application file for complete search history.

(56) References Cited

U.S. PATENT DOCUMENTS

| | | | | |
|---|---|---|---|---|
| 5,375,580 | A | * | 12/1994 | Stolz .................. F02B 29/0443 123/527 |
| 5,441,234 | A | | 8/1995 | White et al. |
| 5,499,615 | A | * | 3/1996 | Lawrence ............... F02B 43/00 123/526 |
| 5,566,712 | A | | 10/1996 | White et al. |
| 5,590,535 | A | | 1/1997 | Rhoades |
| 5,887,567 | A | * | 3/1999 | White ...................... B61C 5/00 123/294 |
| 7,377,267 | B2 | | 5/2008 | Boyer et al. |
| 8,763,565 | B2 | * | 7/2014 | Dunn ................. F02M 21/0209 123/27 GE |
| 2005/0011501 | A1 | | 1/2005 | Shetley |
| 2007/0199539 | A1 | * | 8/2007 | Lennox ............... F02D 19/0628 123/304 |
| 2008/0103676 | A1 | * | 5/2008 | Ancimer ................. F02D 19/10 701/103 |
| 2008/0226463 | A1 | * | 9/2008 | Batenburg ............. F02M 21/06 417/32 |

FOREIGN PATENT DOCUMENTS

| | | |
|---|---|---|
| CA | 2716283 A1 | 4/2012 |
| CA | 2791315 A1 | 12/2012 |
| CA | 2798870 A1 | 2/2013 |
| CN | 1621660 A | 6/2005 |
| EP | 0121028 A1 | 10/1984 |
| JP | 2005308149 A | 11/2005 |
| JP | 2006329359 A | 12/2006 |
| RU | 2189915 C1 | 9/2002 |
| RU | 2427724 C1 | 8/2011 |
| WO | 0186128 A2 | 11/2001 |
| WO | 2010096903 A1 | 9/2010 |
| WO | 2011000042 A1 | 1/2011 |

OTHER PUBLICATIONS

"LNG as a fuel for railroads: Assessment of technology status and economics", published Jan. 1993 by Gas Research Institute, Bob Kirkland of Air Products and Chemicals.
Corrected International Search Report issued on Dec. 9, 2013, in connection with International Application No. PCT/CA2012/050931.
Written Opinion of the International Searching Authority issued on Apr. 3, 2013, in connection with International Application No. PCT/CA2012/050931.
International Preliminary Report on Patentability and Written Opinion of the International Bureau issued on Jun. 24, 2014 in connection with PCT/CA2012/050931.
Office Action issued on Mar. 14, 2013, in connection with Canadian Patent Application No. 2,798,870—"Air-Enriched Gaseous Fuel Direct Injection for an Internal Combustion Engine".
Office Action issued on Jul. 22, 2013, in connection with Canadian Patent Application No. 2,798,870—"Air-Enriched Gaseous Fuel Direct Injection for an Internal Combustion Engine".
Search Report issued by SIPO on Nov. 11, 2015 in connection with co-pending China Application No. 201280064017.2.
"Diesel Engine Control Systems" M.: CJSC "KGI" "Za Rulem", 2004.—480 pages (p. 66 right column-p. 67 left column).
Office Action issued by RPO on Jun. 21, 2016 in connection with co-pending Russia Applicatioin No. 2014128293.

* cited by examiner

METHOD AND APPARATUS FOR SUPPLYING A GASEOUS FUEL TO AN INTERNAL COMBUSTION ENGINE

CROSS-REFERENCE TO RELATED APPLICATIONS

This application is a continuation of International Application No. PCT/CA2012/050931 having an international filing date of Dec. 21, 2012, entitled "Method And Apparatus For Supplying A Gaseous Fuel To An Internal Combustion Engine". The '931 international application claimed priority benefits, in turn, from Canadian Patent Application No. 2,762,697 filed on Dec. 22, 2011. The '931 international application is hereby incorporated by reference herein in its entirety.

FIELD OF THE INVENTION

The present application relates to supplying a gaseous fuel from a store of the gaseous fuel on a tender car to an internal combustion engine of a locomotive for combustion.

BACKGROUND OF THE INVENTION

Since the early 1980s several research projects and demonstration programs have attempted to employ natural gas as a fuel for locomotives. The initial motivation was to determine if any reduction in emission levels could be obtained compared to diesel locomotives, while maintaining the same level of power. These efforts were driven by evolving emission standards for locomotives from the Environment Protection Agency (EPA), for which in 1997 the EPA established Tier 0, 1 and 2 standards, and more recently in 2008 they set the Tier 3 and 4 standards. Both the Tier 3 and 4 standards dramatically reduce emissions of diesel particulate matter (PM) and nitrogen oxide (NOx). Out of these efforts only one commercially available, proven and tested natural gas fuelled line-haul locomotive emerged, which employed a low pressure injection technology. In a paper titled "An Evaluation of Natural Gas-fueled Locomotives", published in November 2007 by BNSF Railway Company, Union Pacific Railroad Company (UPRR), the Association of American Railroads, (together known as the Railroads) and the California Environmental Associates, the Railroads position on natural gas fuelled locomotives was presented. Except for some potential niche applications, the Railroads did not believe there is an opportunity to use natural gas as a locomotive fuel to help meet emissions and performance goals. This position was based on the one known commercially available natural gas fuelled line-haul locomotive available in North America. This product was a conversion kit for the EMD 645 two-stroke diesel engine that enables the locomotive to run on liquefied natural gas (LNG) as a primary fuel, while employing diesel as a pilot fuel. The LNG fuel is vaporized and injected at low pressure (85-125 pounds per square inch (psi)) such that the fuel and air mix during compression. A small portion of diesel "pilot" fuel is then injected into the cylinder at the top of the stroke where it auto-ignites to facilitate combustion.

Several of the research projects and demonstration programs attempted high pressure injection techniques where natural gas fuel was injected late in the compression cycle. In 1992 the UPRR began two of these efforts in separate programs with Electro Motive Diesel (EMD) and GE Transportation Systems (GE) to investigate the use of natural gas in line-haul, high-horsepower locomotive engines. This was a significant, multi-year effort in which UPRR expended over $15 million exploring basic engine and fueling technology issues. The natural gas injection pressures employed in both the EMD and GE systems were in the range between 3000 psi and 4500 psi. Due to technical limitations, the locomotives developed separately by EMD and GE were incapable of revenue operation. The technical difficulties in both programs included failure of gas injectors, cryogenic LNG pumps for handling the cryogenic fuel between the tender tanks and the locomotives, the engine control system software, the gas transition control system software, and fuel system joint leaks.

The conversion kit for the EMD 645 developed out of a project started by Burlington Northern Railroad (BN) in 1987 involving a two pronged effort to develop natural gas fueling infrastructure and line-haul locomotives capable of running on natural gas. For the fueling infrastructure, BN worked with Air Products and Chemicals (APC) to develop fueling locations and cryogenic tank equipped tender cars to support the use of Refrigerated Liquid Methane (RLM), a high purity form of liquefied natural gas, as a locomotive fuel. In a paper titled "LNG as a Fuel for Railroads: Assessment of Technology Status and Economics", published by the Gas Research Institute in January 1993, Bob Kirkland of APC indicates that LNG vaporization can be performed on the locomotive or on the tender car. "As less energy is needed to pump a liquid than to compress a gas, future tender car designs will likely deliver liquid to a pump located on the locomotive and upstream of the vaporizer. It would be impractical, according to Bob Kirkland of Air Products, for the tender car to supply high pressure liquid to the locomotive. Such an arrangement would involve long lengths of high-pressure piping as well as additional hardware between the locomotive and the tender car to power the pump."

Based on the admissions of the Railroads and the results of the research and demonstration projects cited above, it is evident that late cycle, high pressure direct injection of natural gas in a locomotive engine is not a straightforward or obvious undertaking. Several technical challenges exist that have prevented a commercially available natural gas locomotive line-haul product from emerging that can challenge and improve upon the emissions from so called clean diesel locomotive technologies.

The present method and apparatus provide an improved technique for supplying a gaseous fuel from a store of the gaseous fuel on a tender car to an internal combustion engine of a locomotive for combustion.

SUMMARY OF THE INVENTION

An improved method of supplying gaseous fuel from a tender car to an internal combustion engine on a locomotive comprising storing the gaseous fuel at a cryogenic temperature in a cryogenic storage tank on the tender car; pumping the gaseous fuel to a first pressure from the cryogenic storage tank; vaporizing the gaseous fuel at the first pressure; and conveying the vaporized gaseous fuel to the internal combustion engine; whereby a pressure of the vaporized gaseous fuel is within a range between 310 bar and 575 bar. The gaseous fuel can be natural gas, methane or other hydrocarbon gaseous fuels. The method also comprises accumulating the vaporized gaseous fuel such that pressure fluctuations of the gaseous fuel due to changing operating conditions of the internal combustion engine are reduced. A mass flow rate of the internal combustion engine is within a range of 7 kilograms/hour and 600 kilograms/ hour. The accumulation of the vaporized gaseous fuel is within a range of 50 liters and 200 liters. The method further comprises receiving advanced notice of upcoming changes in operating conditions of the internal combustion engine and doing at least one of proactively pumping the gaseous fuel to increase the pressure of the vaporized gaseous fuel, increasing a rate of pumping the gaseous fuel to increase the pressure of the vaporized gaseous fuel, and decreasing a rate of pumping the gaseous fuel to reduce pressure fluctuations above a predetermined pressure threshold. In the method waste heat from the internal combustion engine can be transferred to the gaseous fuel at the first pressure such that the gaseous fuel vaporizes. The waste heat can be transferred from engine coolant to a heat exchange fluid such that the heat exchange fluid transfers heat to the gaseous fuel at the first pressure. The heat exchange fluid can be heated with a supplementary heat source, which can be a gas boiler or an electric heater. When the supplementary heat source is the gas boiler, the gas boiler generates heat by combusting the gaseous fuel from the cryogenic storage tank, and the gaseous fuel which is combusted can be vent gas. The method further comprises reducing conveyance of the vaporized gaseous to the internal combustion engine in response to a decrease in the pressure of the vaporized gaseous fuel below a predetermined pressure threshold.

The method can further comprise delivering low pressure air from a compressed air supply on the locomotive to the tender car; pressurizing the low pressure air to a high pressure; delivering the high pressure air to the locomotive; and forming a gaseous-fuel/air mixture by mixing the vaporized gaseous fuel and the high pressure air on the locomotive. The gaseous-fuel/air mixture is directly introduced into combustion chambers in the internal combustion engine.

The vaporized gaseous fuel can be conveyed to the locomotive in the form of a gaseous-fuel/air mixture. The method further comprises delivering low pressure air from a compressed air supply on the locomotive to the tender car; pressurizing the low pressure air to a high pressure on the tender car; and forming the gaseous-fuel/air mixture by mixing the vaporized gaseous fuel and the high pressure air on the tender car. The gaseous-fuel/air mixture is directly introduced into combustion chambers in the internal combustion engine.

The method can further comprise pressurizing low pressure air on the locomotive to a high pressure; and forming a gaseous-fuel/air mixture by mixing the vaporized gaseous fuel and the high pressure air on the locomotive. The gaseous-fuel/air mixture is directly introduced into combustion chambers in the internal combustion engine.

An improved apparatus for supplying gaseous fuel from a tender car to an internal combustion engine on a locomotive comprising a cryogenic storage tank on said tender car for storing said gaseous fuel at a cryogenic temperature; a first pump for pumping said gaseous fuel to a first pressure from said cryogenic storage tank; a first heat exchanger for vaporizing said gaseous fuel at said first pressure; a conduit for conveying said vaporized gaseous fuel from said first heat exchanger to said internal combustion engine; a pressure sensor operatively connected with said conduit for measuring a pressure of said vaporized gaseous fuel; and an cryogenic controller operatively connected with said first pump and said pressure sensor and programmed to receive pressure signals from said pressure sensor representative of said pressure of said vaporized gaseous fuel and to operate said first pump to maintain said pressure of said vaporized gaseous fuel within a range between 310 bar and 575 bar. The conduit is sized such that it can accumulate vaporized gaseous fuel within a range of 50 liters and 200 liters. Alternatively, an accumulator having a volume within a range of 50 liters and 200 liters can be connected with the conduit for accumulating vaporized gaseous fuel. There is an engine controller for controlling operation of the internal combustion engine. The engine controller is programmed to transmit advanced notice of changes in operating conditions of the internal combustion engine to the cryogenic controller. In response to the advanced notice the cryogenic controller is programmed to change a state of the first pump. The cryogenic controller operates the first pump to increase the first pressure when the advanced notice comprises an upcoming increase in mass flow rate of the vaporized gaseous fuel. The cryogenic controller operates the first pump to decrease a rate of pumping when said advanced notice comprises an upcoming decrease in mass flow rate of said vaporized gaseous fuel. There is a shut-off valve connected between the first heat exchanger and the conduit. The shut-off valve reduces and preferably prevents conveyance of the vaporized gaseous fuel in the conduit when a pressure differential across the shut-off valve reaches a predetermined threshold. The apparatus further comprises a reservoir comprising a heat exchange fluid; a heat transfer pump operatively connected with the reservoir to pump the heat exchange fluid; and a second heat exchanger receiving the heat exchange fluid under pressure from the heat transfer pump and operative to transfer waste heat from a coolant of the internal combustion engine to the heat exchange fluid; such that the heat exchange fluid is circulated through the first exchanger for vaporizing the gaseous fuel at the first pressure. There can be a supplementary heat source for heating the heat exchange fluid. The supplementary heat source can be a gas boiler or an electric heater. The gas boiler generates heat by combusting the gaseous fuel from the cryogenic storage tank, and the gaseous fuel which is combusted can be vent gas. There is also a transfer pump operative to pump the gaseous fuel from the cryogenic storage tank to an intermediate pressure lower than the first pressure. The first pump is operative to pump the gaseous fuel from the intermediate pressure to the first pressure. The cryogenic storage tank can comprise a tank port and the transfer pump comprises an inlet and an outlet. The transfer pump is disposed in the tank port such that the inlet is inside the cryogenic storage tank. In alternative embodiments the apparatus comprises a supplementary vessel connected with the cryogenic storage tank. The supplementary vessel comprises a tank port and the transfer pump comprises an inlet and an outlet. The transfer pump is disposed in the tank port such that the inlet is inside the supplementary vessel. The gaseous fuel can be natural gas or methane.

The apparatus can comprise a supply of low pressure air located on the locomotive. A multi-stage compression apparatus on the tender car pressurizes the low pressure air to a high pressure. A second conduit delivers the low pressure air to the multi-stage compression apparatus. A mixing apparatus on the locomotive forms a gaseous-fuel/air mixture by mixing the high pressure air and the vaporized gaseous fuel. A third conduit delivers the high pressure air from the multi-stage compression apparatus to the mixing apparatus. The gaseous-fuel/air mixture is directly introduced into combustion chambers of the internal combustion engine.

The vaporized gaseous fuel can be conveyed to the locomotive through the conduit in the form of a gaseous-fuel/air mixture. The apparatus comprises a supply of low pressure air on the locomotive. A multi-stage compression apparatus on the tender car pressurizes the low pressure air to a high pressure. A second conduit delivers the low pressure air to the multi-stage compression apparatus. A mixing apparatus on the tender car forms the gaseous-fuel/air mixture by mixing the high pressure air and the vaporized gaseous fuel. The gaseous-fuel/air mixture is directly introduced into combustion chambers of the internal combustion engine.

The apparatus can comprise a supply of low pressure air on the locomotive. A multi-stage compression apparatus on the locomotive pressurizes the low pressure air to a high pressure. A mixing apparatus on the locomotive forms the gaseous-fuel/air mixture by mixing the high pressure air and the vaporized gaseous fuel. The gaseous-fuel/air mixture is directly introduced into combustion chambers of the internal combustion engine.

DETAILED DESCRIPTION OF PREFERRED EMBODIMENT(S)

Figure 1:
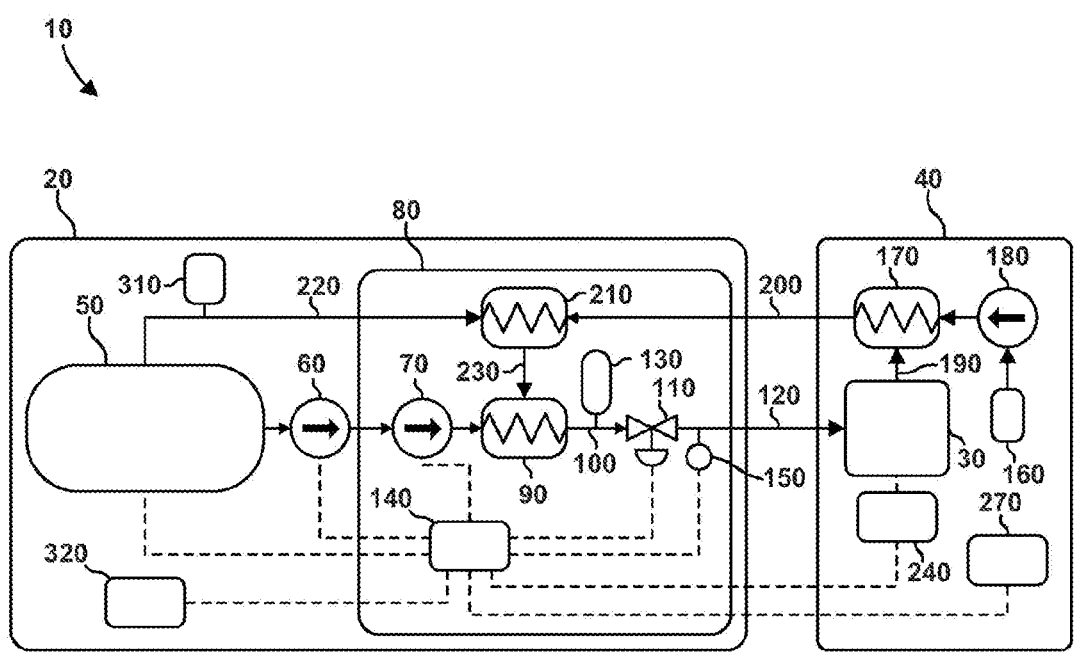
FIG. 1 is a schematic view of an apparatus for supplying gaseous fuel to an internal combustion engine according to one embodiment.

Referring to FIG. 1, fuel apparatus 10 is shown for supplying a gaseous fuel from tender car 20 to internal combustion engine 30 on locomotive 40. Tender car 20 supplies gaseous fuel for combustion in engine 30 and is connected with and hauled by locomotive 40. Cryogenic storage tank 50 is an ISO tank that stores the gaseous fuel at cryogenic temperatures in a liquid phase. As used herein, a gaseous fuel is any fuel that is in a gaseous phase at standard temperature and pressure. The gaseous fuel in tank 50 is LNG in the present example, but in other embodiments the gaseous fuel can refrigerated liquid methane (RLM) or other hydrocarbon fuels. Tank 50 is securely connected with tender car 20 when supplying gaseous fuel for engine 30, and is also detachable such that an empty tank on the tender car can be replaced with a full tank. Tank 50 comprises a fill receptacle and a pressure relief valve to release pressure inside the tank when it builds up beyond predetermined acceptable levels. Cryogenic electronic controller 140 communicates with tank 50 to receive information related to a quantity of LNG remaining in the tank, and this information can comprise a level of LNG in the tank, vapor pressure within the tank, and a temperature of LNG within the tank. In the present example cryogenic controller 140 is a computer comprising a processor and memories, including a permanent memory, such as FLASH or EEPROM, and a temporary memory, such as SRAM or DRAM, for storing and executing a program.

Low pressure liquid fuel pump 60 transfers LNG at low pressure from tank 50 to high pressure liquid fuel pump 70 in high pressure gas supply system 80. As used herein, gas refers to gaseous fuel. Low pressure pump 60 is shown located between tank 50 and high pressure pump 70 in the present example. In other embodiments pump 60 can be located completely within tank 50 or in a tank port such that an inlet of the pump is disposed inside the tank and an outlet is disposed outside the tank. The tank port can also be provided in a secondary vessel connected with tank 50. The secondary vessel couples tank 50 to pump 60 such that the secondary vessel is flooded with LNG from tank 60 and the inlet of the pump is immersed in the LNG in the secondary vessel. It is advantageous to locate low pressure pump 60 such that it can be efficiently maintained at an operational temperature and can be conveniently accessed for maintenance. The operational temperature for pump 60 is close to the boiling temperature of the cryogenic fluid (LNG) such that the fluid does not vaporize in the pump while being pressurized from the inlet to the outlet. In light of the desired advantages the preferred location for pump 60 is in the tank port. However, other factors such as interoperability with existing ISO tanks may require placement of pump 60 in the other locations. In other embodiments, pump 60 and the secondary vessel can be located on high pressure gas supply system 80. In yet other embodiments pump 60 may not be required such that pump 70 receives LNG directly from tank 50. In still further embodiments, pump 70 can be located within another secondary vessel which is flooded with LNG either directly from tank 50 or from pump 60.

High pressure pump 70 pressurizes the LNG from low pressure pump 60 and supplies pressurized liquid fuel to heat exchanger 90 which vaporizes the LNG into a gaseous phase. The gaseous fuel is conveyed from heat exchanger 90 to engine 30 through conduit 100, solenoid valve 110 and conduit 120. Cryogenic controller 140 communicates with pressure sensor 150 to receive information related to the pressure of the gaseous fuel in conduit 120 and commands pumps 60 and 70 to operate in order to maintain a predetermined pressure threshold in conduit 120. The pressure of the gaseous fuel in conduit 120 is maintained between a range of 310 bar (~4500 psi) and 575 bar (~8340 psi) which covers a range of injection pressures for direct fuel injectors (not shown) in engine 30. Injection pressure within this range allows sufficient mass flow rate of gaseous fuel to meet full load operating requirements for engine 30. In addition, as the injection pressure is increased there is a reduction in emissions, and especially in particulate matter (PM).

Valve 110 is commanded by controller 140 to open and close depending upon operating and fault conditions to allow or prevent gaseous fuel from entering conduit 120. Valve 110 also operates as an automatic shutoff valve that automatically closes (without command from controller 140) when the pressure differential across an inlet and an outlet of valve 110 reaches a predetermined magnitude such that conveyance of the gaseous fuel in conduit 120 is reduced, minimized or preferably stopped. This is advantageous in the situation when the tender car 20 accidently breaks away from locomotive 40 while conduit 120 is connected therebetween, in which case the pressure in conduit 120 will suddenly decrease whereby the pressure differential across valve 110 will increase above the predetermined magnitude. In other embodiments valve 110 can be two valves where one valve is commanded by controller 140 to open and close, and the other valve automatically closes based on the inlet-to-outlet pressure differential.

There are other valves (not shown) on tender car 20 that are actuated by compressed air. A compressed air supply (not shown) can be located on locomotive 40, on tender car 20 or in high pressure gaseous fuel system 80. The solenoid of valve 110 can actuate a valve that controls the flow of gaseous fuel directly, or it can actuate a valve that controls the flow of compressed air to another valve that controls the flow of gaseous fuel.

The compressed air supply can be employed for enriching gaseous fuel before it is directly introduced into combustion chambers in engine 30 on locomotive 40. The gaseous-fuel/air mixture provides an increased equivalence ratio in fuel jets in the combustion chambers of engine 30 resulting in improved combustion characteristics and reduced emissions. There are various techniques for providing a gaseous-fuel/air mixture, such as disclosed in the Applicant's co-pending Canadian Patent Application titled "Air-Enriched Gaseous Fuel Direct Injection For An Internal Combustion Engine", filed on Dec. 17, 2012, which is incorporated by reference herein in its entirety. In one such technique, air from the compressed air supply on locomotive 40 is further compressed in a multi-stage compression apparatus on the locomotive to a high pressure. Air from the compressed air supply is approximately 6 bar and can be considered low pressure air. High pressure air from multi-stage compression apparatus is in the range of 155 bar to 575 bar depending upon the technique of mixing air with gaseous fuel and the required injection pressure of the gaseous-fuel/air mixture. High pressure air is mixed with gaseous fuel from conduit 120 in a mixing apparatus on locomotive 40, and the gaseous-fuel/air mixture is introduced directly into combustion chambers of engine 30. In another technique, air from the compressed air supply on locomotive 40 is delivered to the multi-stage compression apparatus that is now located in high pressure gas supply system 80 on tender car 20. The multi-stage compression apparatus pressurizes air to the high pressure. In this technique, the mixing apparatus can be located in supply system 80 such that the gaseous-fuel/air mixture is delivered to locomotive 40 over conduit 120, or can be located on locomotive 40 as in the previous technique such that conduit 120 delivers gaseous fuel and another conduit delivers high pressure air to the mixing apparatus on locomotive 40.

The maximum mass flow rate requirement for engine 30 operating at full load is very large, for example around 600 kg/hr. In contrast the idling flow rate requirement for engine 30 is substantially reduced, for example around 7 kg/hr. Depending upon operating conditions, the instantaneous mass flow rate can vary dramatically between the maximum and idling flow rate requirements. In order to avoid excessive pressure fluctuations in conduit 120, which lead to a reduction in combustion performance and in engine operating stability, accumulator 130 is connected with conduit 100 and acts as a gas buffer that filters pressure fluctuations that occur when instantaneous flow rate requirements for engine 30 change. Based on the mass flow rate requirements for engine 30, accumulator 130 comprises a gas buffer volume within a range of 50 liters and 200 liters. In other embodiments accumulator 130 can be replaced by sizing conduit 100 and/or conduit 120 accordingly.

Returning to heat exchanger 90, its operation will now be further described. Reservoir 160 comprises heat exchange fluid, for example glycol, that circulates in heat exchanger 90 to vaporize the LNG. The heat exchange fluid is transferred through heat exchanger 170 by heat transfer pump 180 such that waste heat in coolant from engine 30 increases its temperature. The coolant from engine 30 is conveyed over conduit 190 and circulates in heat exchanger 170 from which it returns to the engine. The heat exchange fluid is conveyed over conduit 200 to high pressure gas supply system 80, where it circulates through heat exchanger 90 and transfers heat to and vaporizes the LNG. Depending upon how the instantaneous mass flow rate for engine 30 changes based on varying operating conditions, there may not be enough waste heat from engine 30 to meet the vaporization load in heat exchanger 90. In this situation, supplementary heat exchange system 210 can increase the temperature of the heat exchange fluid in conduit 200 before it circulates in heat exchanger 90. System 210 comprises a gas boiler with an isolated combustion air intake and discharge (similar to a sealed combustion residential gas fireplace or industrial radiant heater) that burns gaseous fuel in conduit 220 from tank 50. Conduit 220 conveys vent gas and/or gas vapor from within tank 50 to heat exchange system 210. The heat exchange fluid from conduit 200 is circulated through heat exchange system 210, where its temperature can be increased, and transferred over conduit 230 to heat exchanger 90, from which it returns to reservoir 160 over a return conduit (not shown). Heat transfer pump 180 pressurizes the heat exchange fluid to enable its circulation as described above. As would be understood by those familiar with the technology involved here, heat transfer pump 180 can be located at alternative locations in the above described arrangement of components as illustrated in FIG. 1 that achieve the same result, and such alternative locations are considered within the scope the present disclosure. Similarly, reservoir 160 can be located on locomotive 40, tender car 20 and within high pressure gas supply system 80.

Gas vent system 310 comprises a burner and a low pressure gas accumulator with an outlet regulator. The accumulator captures gas vented from tank 50. Captured gas is flow regulated to the burner to reduce Greenhouse gas emissions. Heat exchange system 210 can be employed to burn gas captured by gas vent system 310.

Conduits 120 and 200 provide a quick connect and disconnect feature that enables these conduits to non-destructively divide into two parts each such that locomotive 40 and tender car 20 can move apart from each other. Shut-off valve 110 blocks the flow of gaseous fuel when conduit 120 divides into two parts in the event of an accidental break-away between locomotive 40 and tender car 20. A shut-off valve can also be provided on locomotive 40 to prevent the heat exchange fluid from spilling out when conduit 200 divides into two parts. As an alternative conduit 200 can comprise a self-closing disconnect which closes when conduit 200 disconnects into two parts, and opens when conduit 200 is connected into one part.

Cryogenic controller 140 communicates with engine electronic controller 240 to receive a feed forward parameter representative of gas demand from engine 30 and to transmit meaningful fault information to enable intelligent decision making on engine 30 if fuel supply is not sufficient for desired operating point. Engine controller 240 is a computer comprising a processor and memories, including a permanent memory, such as FLASH or EEPROM, and a temporary memory, such as SRAM or DRAM, for storing and executing a program. Engine controller 240 commands the direct fuel injectors to open and close valves therein to inject gaseous fuel into cylinders (not shown) in engine 30 and receives signals from sensors (not shown) that monitor operational parameters of the engine. Controller 240 is also responsive to command signals from a locomotive operator communicated by locomotive electronic controller 270 to change the current operating state of engine 30. In response to the sensor signals and the command signals, engine controller 240 informs cryogenic controller 140 of an upcoming change in the quantity of gaseous fuel that will be injected into the cylinders in engine 30 and a corresponding change in the instantaneous mass flow through conduit 120. In response to this advance notice, cryogenic controller 140 can take proactive measures to prepare for the upcoming change by adjusting the current state of pumps 60 and 70. For example, in response to an upcoming increase in the mass flow rate in conduit 120 controller 140 can proactively begin to operate pumps 60 and/or 70, or increase a rate of pumping by increasing the operating speed of pumps 60 and/or 70 if they are already operating, to increase the pressure in conduit 120 such that an undershoot pressure fluctuation below a predetermined lower pressure threshold is reduced, minimized or preferably prevented. Similarly, in response to an upcoming decrease in the mass flow rate in conduit 120 controller 140 can proactively begin decreasing the rate of pumping by decreasing the operating speed of pumps 60 and 70 such that an overshoot pressure fluctuation above a predetermined upper pressure threshold is reduced, minimized or preferably prevented. Cryogenic controller 140 also communicates with telemetry module 320 and informs the telemetry module, engine controller 240 and locomotive controller 270 of faults detected in the components it communicates with, and whether any operational parameters monitored by it are not within predetermined ranges or compliant with predetermined thresholds. Telemetry module 320 communicates wirelessly with a locomotive command center and transmits the data it receives from controller 140, such as tank pressure, tank level and tender car diagnostics. Locomotive controller 270 is a computer comprising a processor and memories, including a permanent memory, such as FLASH or EEPROM, and a temporary memory, such as SRAM or DRAM, for storing and executing a program.

Figure 2:
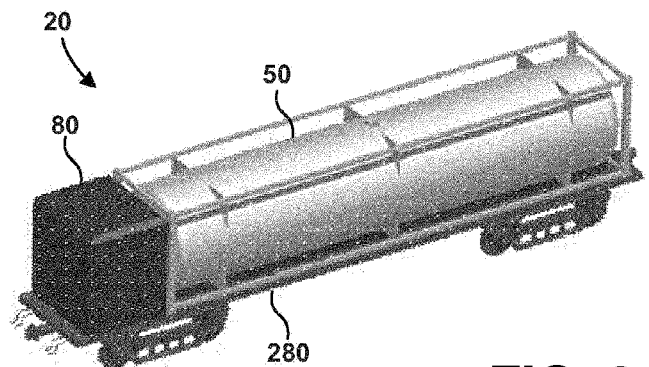
FIG. 2 is a pictorial view of a tender car according to the embodiment of FIG. 1.
Figure 3:
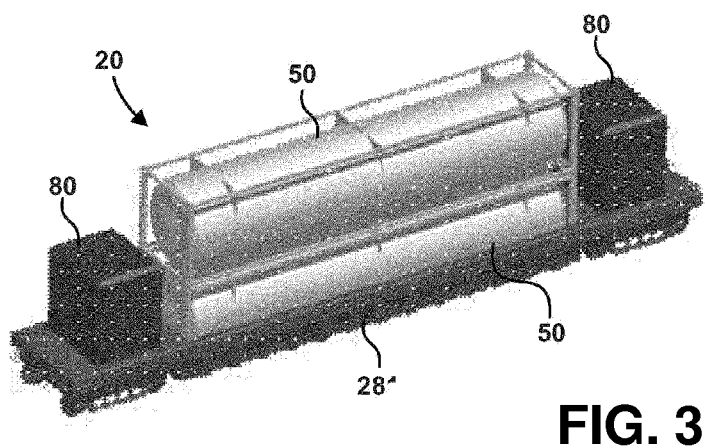
FIG. 3 is a pictorial view of a tender car according to the embodiment of FIG. 1.
Figure 4:
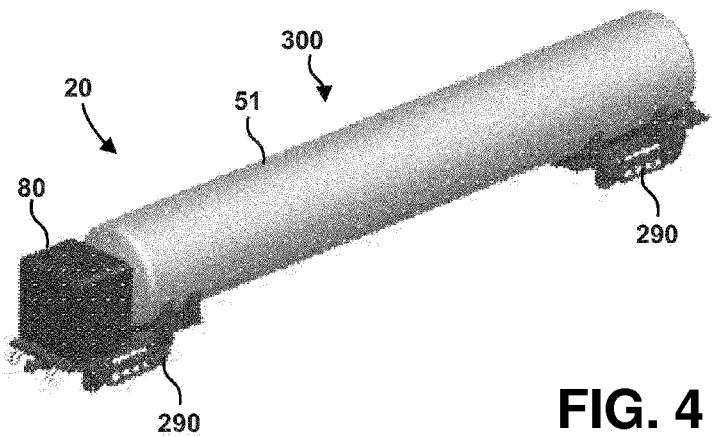
FIG. 4 is a pictorial view of a tender car according to the embodiment of FIG. 1.
Figure 7:
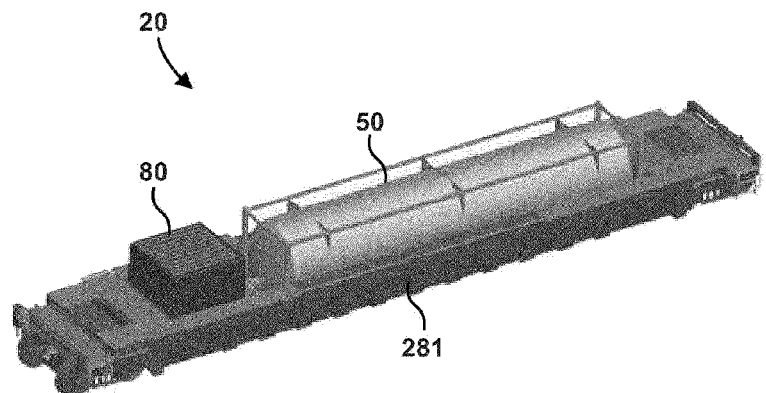
FIG. 7 is a pictorial view of a tender car according to the embodiment of FIG. 1
Figure 8A:
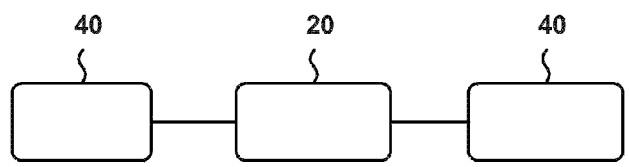
FIG. 8A is a schematic view of an arrangement of a tender car and two locomotives.
Figure 8B:
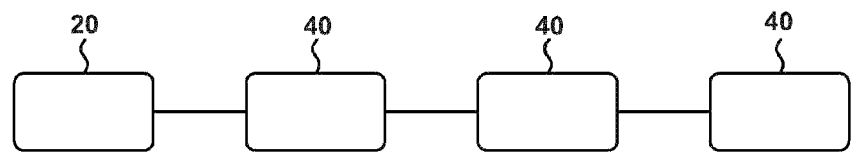
FIG. 8B is a schematic view of an arrangement of a tender car and three locomotives.
Figure 8C:
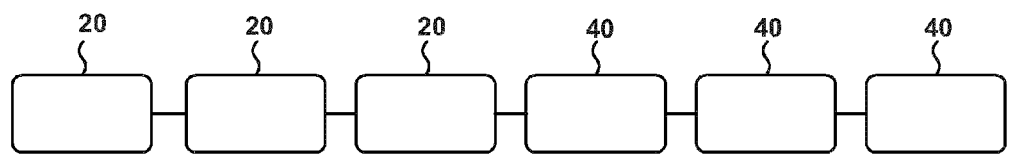
FIG. 8C is a schematic view of an arrangement of three tender cars and three locomotives.

Referring to FIG. 2, tender car 20 further comprises flat car 280 on which cryogenic storage tank 50 and high pressure gaseous fuel supply system 80 are mounted. In FIG. 3, tender car 20 comprises two storage tanks 50 and two supply systems 80, one for a locomotive at either end of well car 281. In other embodiments there can one storage tank 50 and one supply system 80 associated with well car 281. In the embodiment of FIG. 7, both storage tank 50 and supply system 80 are located within the well of well car 281. FIG. 4 illustrates cryogenic rail tank car 300 that has been modified to accommodate high pressure gas supply system 80. Cryogenic rail tank car 300 is conventionally employed to haul cryogenic fluids, and in FIG. 4 it is shown adapted to act as the tender car for locomotive 40. As depicted in FIG. 4, key interface points between the three main subsystems comprise rail car chassis 290, cryogenic storage tank 51 and high pressure gaseous fuel supply system 80. In other embodiments rail car chassis comprises a support extending underneath and supporting storage tank 51. Referring now to FIGS. 8A, 8B and 8C, there are shown examples of advantageous combinations of tender car(s) 20 and locomotive(s) 40 that employ one or more high pressure gas supply systems 80. In these examples, the tender cars can be the ones shown in FIGS. 2, 3, 4 and 7. In FIG. 8A, one tender car 20 supplies gaseous fuel for two locomotives 40 located at opposite ends of the tender car. In FIG. 8B, one tender car 20 supplies gaseous fuel for three locomotives 40 located in sequential order adjacent one end of the tender car. In FIG. 8C, three tender cars 20 arranged in sequential order supply gaseous fuel for three locomotives 40 also arranged in sequential order adjacent the tender cars. There are other advantageous combinations of tender cars 20 and locomotives 40.

Figure 5:
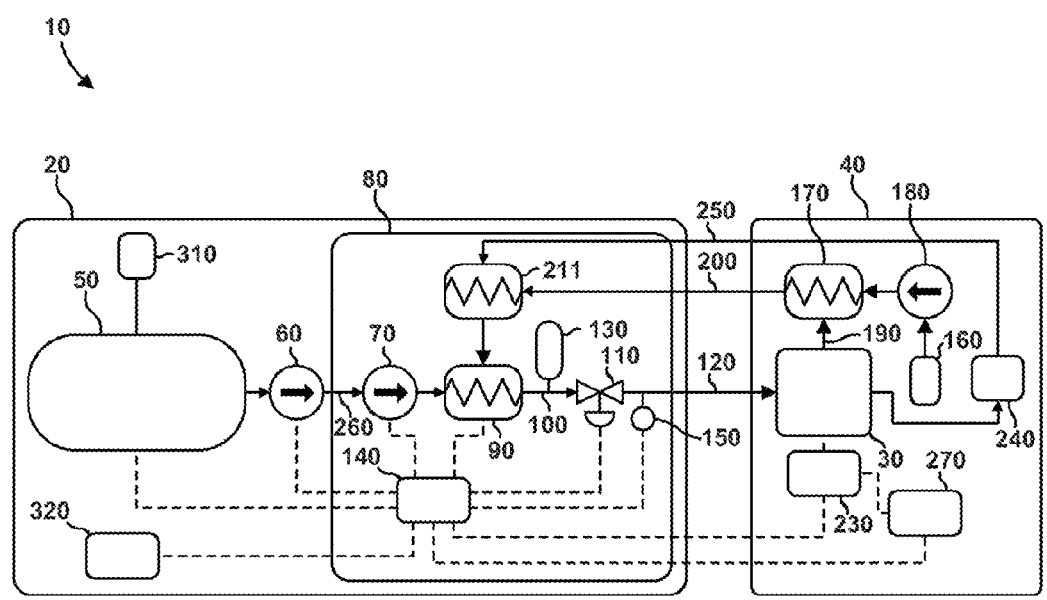
FIG. 5 is a schematic view of an apparatus for supplying gaseous fuel to an internal combustion engine according to a second embodiment.

With reference to the schematic view of FIG. 5, there is shown a second embodiment of fuel apparatus 10 that is similar to the embodiment of FIG. 1 and like parts have like reference numerals and are not described in detail, if at all. Heat exchange system 211 comprises an electric heater (not shown) that receives electrical power from electric generator 240 over conduit 250. Similar to heat exchange system 210, depending upon the current operating state and operating history of engine 30, the electric heater in system 211 can increase the temperature of the heat exchange fluid in conduit 200 before the fluid is circulated in heat exchanger 90. In other embodiments heat exchange system 211 can be located on locomotive 40.

Figure 6:
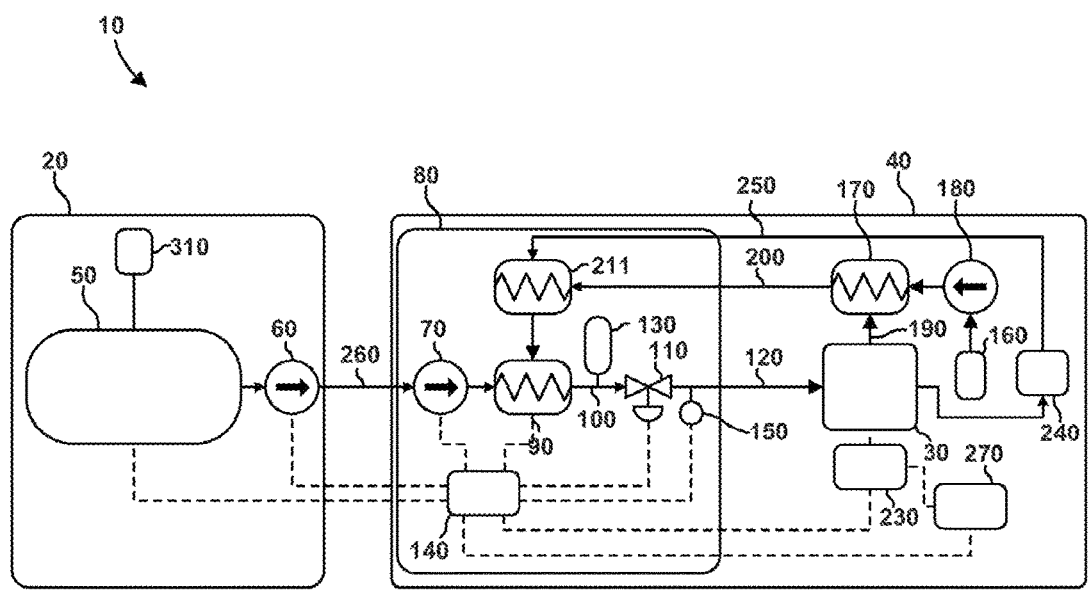
FIG. 6 is a schematic view of an apparatus for supplying gaseous fuel to an internal combustion engine according to a third embodiment.

With reference to the schematic view of FIG. 6, there is shown a third embodiment of fuel apparatus 10 that is similar to the embodiment of FIG. 1 and like parts have like reference numerals and are not described in detail, if at all. High pressure gas supply system 80 is located on locomotive 40. This is advantageous since conduit 260 between pumps 60 and 70, which now runs between tender car 20 and locomotive 40, is at a low pressure which reduces the length of high pressure conduit overall. A similar modification to the embodiment of FIG. 5 can be made.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:
1. An apparatus for supplying gaseous fuel from a tender car to an internal combustion engine on a locomotive comprising:
(a) a cryogenic storage tank on said tender car for storing said gaseous fuel at a cryogenic temperature;
(b) a first pump for pumping said gaseous fuel to a first pressure from said cryogenic storage tank;
(c) a first heat exchanger for vaporizing said gaseous fuel at said first pressure;
(d) a conduit for conveying said vaporized gaseous fuel from said first heat exchanger to said internal combustion engine;
(e) a pressure sensor operatively connected with said conduit for measuring a pressure of said vaporized gaseous fuel; and
(f) a cryogenic controller operatively connected with said first pump and said pressure sensor and programmed to receive pressure signals from said pressure sensor representative of said pressure of said vaporized gaseous fuel and to operate said first pump to maintain said pressure of said vaporized gaseous fuel within a range between 310 bar and 575 bar.

2. The apparatus of claim 1, wherein said conduit is sized such that it can accumulate vaporized gaseous fuel within a range of 50 liters and 200 liters.

3. The apparatus of claim 1, further comprising an accumulator connected with said conduit for accumulating vaporized gaseous fuel.

4. The apparatus of claim 3, wherein said accumulator comprises a volume within a range of 50 liters and 200 liters.

5. The apparatus of claim 1, further comprising an engine controller for controlling operation of said internal combustion engine, said engine controller programmed to transmit advanced notice of changes in operating conditions of said internal combustion engine to said cryogenic controller.

6. The apparatus of claim 5, wherein in response to said advanced notice said cryogenic controller programmed to change a state of said first pump.

7. The apparatus of claim 6, wherein when said advanced notice comprises an upcoming increase in mass flow rate of said vaporized gaseous fuel, said cryogenic controller operates said first pump to increase said first pressure.

8. The apparatus of claim 6, wherein when said advanced notice comprises an upcoming decrease in mass flow rate of said vaporized gaseous fuel, said cryogenic controller operates said first pump to decrease a rate of pumping.

9. The apparatus of claim 1, further comprising a shut off valve connected between said first heat exchanger and said conduit, wherein said shut off valve reduces conveyance of said vaporized gaseous fuel in said conduit when a pressure differential across said shut off valve reaches a predetermined threshold.

10. The apparatus of claim 9, wherein said shut off valve prevents conveyance of said vaporized gaseous fuel in said conduit when a pressure differential across said shut off valve reaches a predetermined threshold.

11. The apparatus of claim 1, further comprising a transfer pump operative to pump said gaseous fuel from said cryogenic storage tank to an intermediate pressure lower than said first pressure, said first pump operative to pump said gaseous fuel from said intermediate pressure to said first pressure.

12. The apparatus of claim 11, wherein said cryogenic storage tank comprises a tank port and said transfer pump comprises an inlet and an outlet, said transfer pump disposed in said tank port such that said inlet is inside said cryogenic storage tank.

13. The apparatus of claim 11, further comprising a supplementary vessel connected with said cryogenic storage tank, said supplementary vessel comprising a tank port and said transfer pump comprising an inlet and an outlet, transfer pump disposed in said tank port such that said inlet is inside said supplementary vessel.

14. The apparatus of claim 1, wherein said gaseous fuel is natural gas.

15. The apparatus of claim 1, further comprising:
a supply of low pressure air on said locomotive;
a multi-stage compression apparatus on said tender car for pressurizing said low pressure air to a high pressure;
a second conduit delivering said low pressure air to said multi-stage compression apparatus;
a mixing apparatus on said locomotive for forming a gaseous-fuel/air mixture by mixing said high pressure air and said vaporized gaseous fuel; and
a third conduit for delivering said high pressure air from said multi-stage compression apparatus to said mixing apparatus;
wherein said gaseous-fuel/air mixture is directly introduced into combustion chambers of said internal combustion engine.

16. The apparatus of claim 1, wherein said vaporized gaseous fuel is conveyed to said locomotive through said conduit in the form of a gaseous-fuel/air mixture, the apparatus further comprising:
a supply of low pressure air on said locomotive;
a multi-stage compression apparatus on said tender car for pressurizing said low pressure air to a high pressure;
a second conduit delivering said low pressure air to said multi-stage compression apparatus; and
a mixing apparatus on said tender car for forming said gaseous-fuel/air mixture by mixing said high pressure air and said vaporized gaseous fuel;
wherein said gaseous-fuel/air mixture is directly introduced into combustion chambers of said internal combustion engine.

17. The apparatus of claim 1, further comprising:
a supply of low pressure air on said locomotive;
a multi-stage compression apparatus on said locomotive for pressurizing said low pressure air to a high pressure; and
a mixing apparatus on said locomotive for forming said gaseous-fuel/air mixture by mixing said high pressure air and said vaporized gaseous fuel;
wherein said gaseous-fuel/air mixture is directly introduced into combustion chambers of said internal combustion engine.

18. An apparatus for supplying gaseous fuel from a tender car to an internal combustion engine on a locomotive comprising:
a cryogenic storage tank on said tender car for storing said gaseous fuel at a cryogenic temperature;
a first pump for pumping said gaseous fuel to a first pressure from said cryogenic storage tank;
a first heat exchanger for vaporizing said gaseous fuel at said first pressure;
a conduit for conveying said vaporized gaseous fuel from said first heat exchanger to said internal combustion engine;
a pressure sensor operatively connected with said conduit for measuring a pressure of said vaporized gaseous fuel; and
a cryogenic controller operatively connected with said first pump and said pressure sensor and programmed to receive pressure signals from said pressure sensor representative of said pressure of said vaporized gaseous fuel and to operate said first pump to maintain said pressure of said vaporized gaseous fuel within a range;
a reservoir comprising a heat exchange fluid;
a heat transfer pump operatively connected with said reservoir to pump said heat exchange fluid; and
a second heat exchanger receiving said heat exchange fluid under pressure from said heat transfer pump and operative to transfer waste heat from a coolant of said internal combustion engine to said heat exchange fluid;
wherein said heat exchange fluid is circulated through said first heat exchanger for vaporizing said gaseous fuel at said first pressure.

19. The apparatus of claim 18, further comprising a supplementary heat source for heating said heat exchange fluid.

20. The apparatus of claim 19, wherein said supplementary heat source is one of a gas boiler and an electric heater.

21. The apparatus of claim 20, wherein when said supplementary heat source is said gas boiler, said gas boiler generates heat by combusting said gaseous fuel from said cryogenic storage tank.

22. The apparatus of claim 21, wherein said gaseous fuel is vent gas from said cryogenic storage tank.

* * * * *